United States Patent Office 3,075,832
Patented Jan. 29, 1963

3,075,832
STABILIZED COMPOSITIONS
George G. Ecke and Alfred J. Kolka, Pittsburgh, Pa., assignors to Ethyl Corporation, New York, N.Y., a corporation of Delaware
No Drawing. Filed July 30, 1958, Ser. No. 751,847
2 Claims. (Cl. 44—78)

This invention relates to a method of introducing hydrocarbon groups onto the nuclear ring of phenols. More particularly, this invention relates to the ortho-alkylation of phenols and to new compositions of matter obtained thereby. Further this invention relates to certain novel compositions containing an ortho-alkylation product of the process of this invention as an antioxidant. This application is a continuation-in-part of application Serial No. 601,373, filed August 1, 1956, and now abandoned.

In the past, substituents have been introduced onto the ring of aromatic compounds in a number of ways. One method known to the art is the Friedel-Crafts alkylation whereby an aromatic compound is reacted with a halogenated aliphatic hydrocarbon in the presence of aluminum chloride. By this method one or more alkyl groups are introduced at various positions on the ring. One difficulty experienced when using this process is that the alkylation is nonspecific in that a distribution of the various alkylated isomers is obtained. Another difficulty experienced with Friedel-Crafts alkylation is the rearrangement of the carbon skeleton when branched chain hydrocarbons are introduced. Also, cleavage of highly branched long chain hydrocarbons often occurs. When groups other than alkyl are desired on the aromatic ring, a round-about method of synthesis must be resorted to. It is evident, therefore, that a need exists for a method of introducing organic groups into specific positions on the nuclear portion of phenols which will result in a product that is not contaminated by substances produced due to side reactions or rearrangements.

It is, therefore, an object of this invention to provide a process for the introduction of hydrocarbon groups onto the nuclear ring of hydroxy aromatic compounds. A further object of this invention is to provide a process for introducing hydrocarbon groups onto the aromatic ring of phenols in at least one position ortho to a hydroxyl group. Another object is to provide a novel and useful process for the ortho-alkylation of phenolic compounds. It is also an object of the present invention to provide new compositions of matter described more fully hereinbelow. Another object of this invention is to provide novel compounds useful as antioxidants. Still another object is to provide new compositions of matter including an organic material normally tending to deteriorate in the presence of air and a novel antioxidant prepared by the process of this invention. Other objects will be apparent from the ensuing description.

The objects of this invention are accomplished by reacting (1) a hydrocarbon possessing olefinic unsaturation with (2) a hydroxy aromatic compound having at least one carbon atom ortho to a nuclear hydroxyl group available for substitution, in the presence of an aluminum phenoxide catalyst. One decided advantage obtained by utilizing the process of our invention is that substituents can be selectively introduced onto the aromatic ring in the position or positions ortho to the hydroxyl group. By adjusting the reaction conditions, predominantly ortho substitution can be obtained. In a number of cases the ortho substituted product is obtained to the exclusion of all other isomers. Thus, our process gives a direct route for the synthesis of many desirable chemicals, many of which are not obtainable in the pure state by means known heretofore.

The hydroxy aromatic compounds that can be used in this process are compounds having at least one hydroxyl group bonded to a carbon atom of an aromatic ring and can be mono- or poly-nuclear, and also mono- or polyhydroxy as for example, hydroxy benzenes, hydroxy anthracenes, hydroxy naphthalenes, hydroxy phenanthrenes, hydroxy diphenyls and the like. The hydroxy aromatic compound can also have other substituents on the aromatic ring. Of the various phenols, we prefer to utilize those possessing one, two or three condensed rings in the nuclear portion of the molecule. In particular, we prefer to use hydroxy benzenes, notably phenol or catechol, as one of our reactants.

The hydrocarbons possessing olefinic unsaturation which are reacted with the hydroxy aromatic compound can be mono- or poly-olefins (including mixtures of olefins); cyclo-olefins; and aryl substituted olefins. We prefer to use hydrocarbons possessing olefinic unsaturation which have from two to about twenty carbon atoms in the molecule. Of the olefins we particularly prefer those of lower molecular weight, as for example, ethylene, propylene, the various butylenes, and the like, up to olefins containing about twelve carbon atoms such as dodecene, although olefins of higher molecular weight up to and including those containing about twenty carbon atoms such as eicosene can also be used.

As catalyst in the process of this invention, an aluminum phenoxide is used. In general, this catalyst can be prepared from a phenol or mixture of phenols and the phenolate portion of the catalyst molecule can be the same as or different from the phenol that is being alkylated. It is preferable to employ an aluminum phenoxide prepared from a phenol which is the same as that being subjected to the process of this invention because a product of higher purity is normally obtained in this manner.

The catalyst can be prepared in a number of ways. One method is to react a phenol directly with aluminum to form the phenoxide of that element. Another method is to react a phenol with a derivative of an acidic compound of aluminum which is weaker acid than the phenol. Still another method of preparing the catalyst is to react a salt of a phenol such as sodium phenoxide with an aluminum halide such as $AlCl_3$, $AlBr_3$, etc. While the catalyst can be prepared by any of the above methods, we prefer to prepare the catalyst by reacting a phenol directly with finely divided aluminum—aluminum powder, chips, turnings, etc.—or with an acid salt of that element wherein the acid comprising the salt is a weaker acid than the phenol. The direct preparation of the catalyst by reacting a phenol with finely divided aluminum is usually most efficacious because of the simplicity and low cost of this method.

The catalyst can be preformed or prepared in situ. However, there are certain advantages in utilizing a preformed catalyst. One such advantage is that there is no hydrogen given off during the course of the substitution reaction. Another advantage of using a preformed catalyst is that greater partial pressures of gaseous reactants can be obtained since no volume is taken up by the liberated hydrogen. Therefore, while the catalyst can be prepared in situ and in some cases there is no objection to so doing, in general we prefer to prepare the catalyst prior to the addition of the substitution agent.

The amount of catalyst used is dependent to some extent upon the temperature at which the reaction is conducted, the reactivity of the reagents and the activity of the catalyst. At higher temperatures somewhat smaller amounts of catalysts can be used than are preferable at lower temperatures. Generally, the amount of aluminum phenoxide catalyst used should be between about 0.01 and 30 percent by weight of the amount of phenolic reagent used. We prefer to employ from about 1.00 to about 25 percent of catalyst based on the weight of the phenol used as it is found that this amount of catalyst produces a very satisfactory rate of reaction. However, greater amounts of catalyst can be used. In fact, one variant of the process of this invention is to directly react a hydrocarbon possessing olefinic unsaturation with an aluminum phenoxide containing only a minor proportion or trace of free phenol, formed from a phenol having a hydrogen atom on at least one carbon atom ortho to the hydroxyl group. An inert solvent such as a saturated hydrocarbon, which is liquid at the temperature and pressure of reaction can be used. On completion of the reaction between the hydrocarbon possessing olefinic unsaturation and the aluminum phenoxide, the product is subjected to standard hydrolysis conditions whereby the hydrocarbon-substituted phenol is liberated from the aluminum. This substituted phenol can then be recovered from the inert solvent, hydrolyzing agent and resulting aluminum salts by conventional methods.

In carrying out the process of this invention it has become possible to synthesize novel compounds. In particular the ortho-alkylation of catechol by the process of this invention produces a novel class of dialkyl catechols which are substituted in positions ortho to both hydroxyl groups. These novel 3,6 dialkyl catechols are characterized in that the alkyl substituents contain from 4 to about 10 carbon atoms and have a branched chain on the carbon atom immediately adjacent the aromatic nucleus. The novel compounds are very effective antioxidants in organic material normally tending to deteriorate in the presence of air, as will be pointed out in greater detail hereinafter.

The invention will be more fully understood by reference to the following illustrative examples in which all parts are by weight, the percent conversion is calculated on the basis of the amount of phenol charged to the reaction vessel, and the percent yield is calculated on the basis of the amount of phenol unrecovered at the end of the reaction.

EXAMPLE 1

Alkylation of Phenol With Ethylene

*Preparation of the catalyst.*—A reaction vessel equipped with means for charging and discharging of liquids and solids, having a number of gas inlet and outlet lines, temperature measuring devices and means for refluxing liqiuds, and which is fitted with a mechanical agitator, was flushed with nitrogen at an elevated temperature in order that all oxygen and moisture be removed from the vessel. While maintaining the flow of nitrogen, there was added to this vessel 300 parts of phenol. The flow of nitrogen continued during the following steps. The temperature of the phenol was raised to 165° C. and then 4.5 parts of aluminum turnings were added in small increments. The reaction was very vigorous and accompanied by a rapid evolution of hydrogen. Agitation was maintained during the reaction which lasted for fifteen minutes. When the reaction had ceased the mixture was allowed to cool to about 60° C. and the agitation discontinued. At this point, the aluminum phenoxide catalyst mixture was ready for charging to the pressure resistant vessel for the next step in the synthesis.

*Ortho-ethyl phenol.*—A pressure resistant vessel having a removable cap for charging and discharging liquids and solids equipped with a plurality of gas inlet and outlet lines, temperature measuring devices and pressure gauges, and fitted with a mechanical agitator was flushed with nitrogen and charged with the aluminum phenoxide catalyst mixture described above. A flow of dry nitrogen was maintained through the pressure resistant vessel and also through the vessel containing the catalyst during the period that the catalyst was being transferred in order that the mixture not be exposed to oxygen or moisture of the air.

The pressure resistant vessel was next charged with an additional 300 parts of phenol, the vessel clamped shut and the flow of nitrogen discontinued. The reaction vessel was then heated to 200° C. and pressurized to 21 atmospheres with ethylene. The reaction mixture was further heated and at a temperature of 280° C. a pressure drop indicated the commencement of reaction. At this point, the vessel was further pressurized with ethylene to 55 atmospheres. As the reaction proceeded and the pressure slowly dropped, more ethylene was admitted to keep the pressure in the vessel within the range of 41–55 atmospheres. A total pressure drop of 140 atmospheres was observed in a ten-hour period. At the end of this time the heating was discontinued and the pressure resistant vessel and its contents allowed to cool. When the temperature had reached 25° C., 250 parts of water were added to hydrolyze the catalyst. The contents were withdrawn from the reaction vessel and the aqueous layer discarded. The product was filtered, dried by azeotropic distillation with toluene, and then subjected to fractional distillation to yield 189 parts of o-ethylphenol (24.3 percent conversion, 42.5 percent yield), boiling at 201–203° C. (literature, 201–203° C.); 79 parts of 2,6-diethylphenol (8.3 percent conversion, 14.5 percent yield), boiling at 219° C. and having a melting point of 37–38° C. (literature, 37.5° C.). A minor amount of phenetole and a few parts of a higher boiling fraction were also recovered. An aryloxyacetic acid derivative of o-ethylphenol had a melting point of 138–140° C. (literature, 140–141° C.). The infra-red spectrum of the o-ethylphenol is substantially identical with that reported in the literature. A reference spectrum was not available for the 2,6-diethylphenol. The spectrum did reveal that no meta or para ethylphenol was present.

EXAMPLE 2

Alkylation of o-Cresol With Eethylene

Ten thousand, seven hundred and fifty parts of o-cresol and 74.8 parts of aluminum were charged to a vessel similar to that used in alkylation step of Example 1. The vessel was flushed twice with nitrogen and then sealed. The contents of the vessel were then heated with stirring to a temperature of approximately 230° C. during which time the pressure rose to a maximum of 220 p.s.i.g. At this point the heating was discontinued, but agitation was continued for one hour after which time the vessel was cooled, the hydrogen pressure vented, and the vessel flushed with introgen. After all the hydrogen had been removed the vessel was again heated with agitation to 165° C. and pressurized with ethylene to 400 p.s.i.g. The ethylene feed was continued at pressures ranging from 380 to 570 p.s.i.g. until 2239.6 parts of ethylene had been charged to the vessel. The contents of the vessel were agitated and heat was maintained until a constant ethylene pressure was attained. After cooling and venting of the vessel the contents thereof were discharged into 4000 parts of water and 1584 parts of hydrochloric acid. The organic phase which separated from the water was filtered and the filter cake was washed with a solution of sodium bicarbonate and then water. This solid was fractionated at a reduced pressure of 100 millimeters of mercury and 2086.6 parts of 2-methyl-6-ethyl phenol having a boiling point of from 124.5 to 128° C. at this pressure was recovered. This represents a 15.4 percent yield based on o-cresol. 2-ethyl-6-methyl phenol has a refractive index of 1.5297 at 20° C.

EXAMPLE 3

Following the general procedure of Example 2, 440.5 parts of hydroquinone, 170 parts of toluene and 34 parts of aluminum isopropoxide were reacted with isobutylene at a maximum temperature at 220° C. and a maximum pressure of 400 p.s.i.g. for four hours. The crude product was discharged into an approximately equal volume of ether, stirred and then filtered. The solid cake remaining was treated with dilute hydrochloric acid and leached with ether. The organic phases were then combined and extracted with a total of 3200 parts of aqueous sodium hydroxide. The organic phase which remained was evaporated yielding 350 parts of crude 2,5-di-tert-butyl hydroquinone. This material melted at approximately 200° C.

The caustic phase was acidified, ether extracted, and then evaporated down to a solid mass which was leached with hot water. The hot water soluble material, 130 parts, was a mixture of hydroquinone and o-tert-butyl hydroquinone. This latter material had a melting point above 140° C. 130 parts of water insoluble material which melted at 123 to 126° C. did not depress the melting point of an authentic sample of o-tert-butyl hydroquinone.

To demonstrate the applicability of the process of this invention a number of other experiments were conducted on a number of phenols utilizing various olefinic compounds as alkylating agents in the presence of an aluminum phenoxide as a catalyst. The results of these experiments are summarized in Table I. The numbers in parenthesis indicate parts by weight unless otherwise stated. Where no parts are indicated, an excess of the reactant was used, or the exact amount is unknown due to the experimental procedure. The catalysts were prepared from the phenol undergoing alkylation and aluminum or from the phenol and aluminum isopropoxide as indicated.

TABLE I

| Ex. | Reactants | | | Reaction conditions | | | Products and properties |
|---|---|---|---|---|---|---|---|
| | Phenol | Olefin | Catalyst prepared from— | Maximum temp., °C. | Maximum pressure | Reaction time | |
| 4 | 3,5-dimethyl phenol (611). | Propylene | Aluminum (4.5) | 225 | 500 p.s.i.g | 5 hours | 3,5-dimethyl-2-isopropyl phenol (345.2). 3,5-dimethyl-2,6-diisopropyl phenol (224.8), M.P. 92-95°C. 3,5-dimethylphenyl isopropyl ether (38). |
| 5 | 1-naphthol (502) | do | Aluminum isopropoxide (17). | 308 | 300 p.s.i.g | 3 hours | 2-isopropyl-1-naphthol (345.3), B.P. 192.4-193.5° C. at 30 mm., M.P. 49.50° C. |
| 6 | Phenol (885.2) | 2-methyl-butene-2 (1225). | Aluminum (9.3) | 160 | 170 p.s.i.g | 20 hours | o-Tert-amyl phenol (43 percent conversion), B.P. 240.7° C. at 760 mm., M.P. 280° C. Refractive index $n_D^{20}$ 1.5229. |
| 7 | Phenol (234) | Diisobutylene (252). | Aluminum (4.0) | 280 | 60 p.s.i.g | 90 minutes | 2-(1,1,3,3-tetramethylbutyl) phenol (11.2 percent conversion), B.P. 157-158.5° C. at 30 mm., M.P. 42-44° C. Refractive index 1.5134 $n_D^{20}$ (super-cooled liquid). 4-(1,1,3,3-tetramethylbutyl) phenol (25.1 percent conversion), B.P. 175° C. at 30 mm., M.P. 85-86° C. Di-(1,1,3,3-tetramethylbutyl) phenol (6.2 percent conversion), B.P. 216.5-217.5° C. at 30 mm. |
| 8 | o-Cresol (540.7) | Diisobutylene (16.7). | Aluminum (4.5) | 130 | 25 p.s.i.g | 2 hours | 2-methyl-6-octyl phenol (18.6 percent conversion), M.P. 67° C., B.P. 165-166° C. at 30 mm. 2-methyl-4-octyl phenol (16.88 percent conversion), B.P. 176.5-178° C. at 30 mm., M.P. 51-52° C. |
| 9 | Phenol (300) | Decene-1 (167) | Aluminum (4.6) | 300 | Atmospheric | 90 minutes | 2-(1-methylnonyl) phenol (49 percent conversion), B.P. 198-200.5° C. at 30 mm. Refractive index 1.5010. 2,6-di-(1-methylnonyl) phenol (5.8 percent conversion), B.P. 205-208° C. at 2 mm. Refractive index $n_D^{20}$ 1.4900. |
| 10 | do | Cyclohexene (262). | Aluminum (2.25) | 259 | 10 atmospheres | (1) | o-Cyclohexyl phenol (41.6 percent conversion), B.P. 170° C. at 30 mm., M.P. 55.5-57° C. 2,6-di-cyclohexyl phenol (20.2 percent conversion), B.P. 160° C. at 1 mm., M.P. 62-65° C. p-Cyclohexyl phenol (trace). |
| 11 | Phenol (188) | Styrene (208) | Aluminum (2.7) | 185 | Atmospheric | 2½ hours [2] | 2-(1-phenylethyl) phenol, B.P. 124-125° C. at 0.2 mm. Di-(1-phenylethyl) phenol, B.P. 171-180° C. at 0.2 mm. |
| 12 | Phenol (2823) | Isoprene (2043) | Aluminum (2.5) | 114 | 70 p.s.i.g | 1 hour | 1,1-dimethylpropene-2-phenyl ether (16.5 percent conversion), B.P. 118.8-119.5° C. at 30 mm. Refractive index $n_D^{20}$ 1.5259. 2-(1,1-dimethylpropyl-2-ene) phenol (7 percent conversion), B.P. 149.5/152° C. at 30 mm. Refractive index $n_D^{20}$ 1.5396. 1,1-dimethylpropene-2-[p-(1,1-dimethyl propyl-2-ene)-phenyl] ether (4.3 percent conversion), B.P. 180-182° C. at 30 mm. Refractive index $n_D^{20}$ 1.5240. |
| 13 | p-Methoxy phenol (500). | Propylene | Aluminum (4.5) | 240 | 700 p.s.i.g | 90 minutes | p-Methoxy phenol isopropyl ether (7.1 percent conversion). 2-isopropyl-4-methoxy phenol (28.6 percent conversion), B.P. 159.5-161.5° C. at 30 mm. 2,6-diisopropyl-4-methoxy phenol (28.1 percent conversion), B.P. 171-173° C. at 30 mm. |
| 14 | p-Methoxy phenol (4000). | Isobutylene | Aluminum (36) | 175 | 200 p.s.i.g | 29 minutes | 2,5-di-tert-butyl-4-methoxy phenol (trace). 2,6-di-tert-butyl-4-methoxy phenol (95.7 weight percent). |
| 15 | o-Chloro phenol (643.8). | do | Aluminum (4.5) | 102 | 80 p.s.i.g | 2 hours | 2-chloro-6-tert-butyl phenol (59.6 percent conversion). 2-chloro-4,6-di-tert-butyl phenol (6.44 percent conversion). 2,6-di-tert-butyl phenol (2.98 percent conversion). o-Chlorophenyl-tert-butyl ether (2,2 percent conversion). |
| 16 | p-Chloro phenol (385.7). | Propylene | Aluminum (2.25) | 170 | 660 p.s.i.g | 3.5 hours | 2,6-diisopropyl-4-chlorophenol (45.7 percent conversion). 2-isopropyl-4-chlorophenol. |
| 17 | Catechol (440.4) | do | Aluminum isopropoxide (34). | 275 | 700 p.s.i.g | 220 minutes | 1,2-dihydroxy-3-isopropylbenzene (73.9), B.P. 155-156.5° C. at 30 mm. 3,6-diisopropyl catechol (350.1), M.P. 74-75° C. 3,5-diisopropyl catechol (106.2), M.P. 91.5° C. |

[1] Reaction continued until no further evidence of a pressure drop.
[2] Styrene added during first 0.5 hour.

The temperatures and pressures required when ethylene is used as an alkylating agent are considerably higher than those necessary when a higher olefin such as propylene or isobutylene is used as an alkylating agent in the presence of an aluminum phenoxide catalyst. By adjusting the reaction conditions large yields of various isopropyl phenols can be achieved. Thus, the present process can be conducted so as to obtain predominant amounts of 2-isopropyl phenol, 2,6-diisopropyl phenol, 2,4,6-triisopropyl phenol, etc. In the practice of this invention, alkyl substituted phenols may be ortho-alkylated with olefins. Thus, for example, p-ethyl phenol, p-octyl phenol, p-nonyl phenol, m-methyl phenol, o-isopropyl phenol, 3,5-diethyl phenol and 3-ethyl-5-methyl phenol all readily lend themselves to ortho alkylation by the process of this invention. It is preferable to use substituted phenols in which at least one pair of adjacent ortho and meta positions are unsubstituted, as good yields are obtained by the use of these compounds.

By proper control of reaction conditions and selection of reactants it is possible to selectively introduce different alkyl groups onto the nucleus of an aromatic phenol. Thus, 2-isopropyl-6-tert-butyl phenol has been produced by first preparing 2-isopropyl phenol from isopropylene and phenol in the presence of aluminum phenoxide and subsequently alkylating the 2-isopropyl phenol with isobutylene in the presence of aluminum 2-isopropyl phenoxide. This principle can be extended to other substituted phenols to produce, for example, 2-ethyl-6-isopropyl phenol, 2-isopropyl-4-methyl-6-tert-butyl phenol and 2-isopropyl-6-(1'-methyl-butyl) phenol.

The process of this invention is applicable to cyclo-olefins. For example, cyclohexene, 1,4-cyclohexadiene, 1,4-cyclopentadiene, 3-methylcyclohexene, 4-ethylcyclopentene and cycloheptene are valuable alkylating agents when reacted with phenols in the presence of an aluminum phenoxide catalyst. The applicability of alkylating a phenol with an aryl olefin is illustrated by the reaction with styrene. In addition to styrene other olefin substituted aromatic compounds are utilizable as alkylating agents for phenols. Examples of these aryl olefins are α-methyl styrene, 3-methyl styrene, 1-phenyl butene-2 and 1-(4'-propyl phenyl)-2 methyl propene-2. The process of this invention is applicable to polyolefins such as isoprene as well as monolefins. In addition to isoprene other polyolefins and branched chain polyolefins which do not contain a conjugated double bond system are useful as alkylating agents.

The process of this invention is equally applicable to phenols which are halogen substituted in the ortho, meta or para positions so long as at least one position ortho to the hydroxyl group remains unsubstituted. Examples of these halogen substituted phenols are m-chlorophenol, o-bromophenol, p-iodophenol, m-fluorophenol, p-bromophenol, 3,5-dibromophenol, 3-bromo-5-chlorophenol and 2,4-dichlorophenol.

This invention is applicable to alkoxy phenols in general where a hydrogen immediately adjacent to phenolic group in the benzene ring is available for substitution. Examples of such compounds are 3-ethoxy phenol, p-n-propoxy phenol, 4-tert-butoxy phenol, p-pentoxy phenol and m-2-hexoxy phenol.

By properly adjusting the conditions under which the alkylation reaction is conducted it is possible not only to get a high yield of a desired product but it is also possible to convert a mixture into an excellent yield of certain desired products. Thus, the alkylation of phenol with isobutylene can be made to yield o-tert-butyl phenol, p-tert-butyl phenol or 2,6-di-tert-butyl phenol depending only on the reaction conditions.

The o-alkylation process of this invention is applicable to polynuclear aromatic hydroxy compounds. The reaction is applicable, for example, to 2-naphthol, 3-methyl-1-naphthol, 8-ethyl-1-naphthol, 1,8-dihydroxy-5-ethyl naphthalene, 1-phenanthrol, 1-hydroxy anthracene, 2-hydroxy anthracene and other polynuclear and substituted polynuclear aromatic hydroxy compounds. Example 18 illustrates the reaction of naphthol with isobutylene.

EXAMPLE 18

Following the procedure of Example 3 naphthol-1 is reacted with isobutylene at temperatures of between 225 and 250° C. The pressure increases several fold as the temperature is raised to this range. The reaction yields 2-tert-butyl-1-naphthol of high purity.

The process of this invention is applicable to high molecular weight olefins such as straight chain and branched chain mono and poly olefins. It is preferred, however, to alkylate hydroxy aromatic compounds with olefins having up to about 20 carbon atoms, as olefins of higher molecular weight are more difficult to prepare and are considerably less reactive.

EXAMPLE 19

Three hundred parts of phenol and 4.5 parts of aluminum turnings are charged to an autoclave along with 43 parts of toluene. The autoclave is sealed and heated until a pressure and temperature rise indicate the formation of the aluminum phenoxide catalyst. Heating is then discontinued and agitation continued for one hour. The autoclave is then cooled to room temperature, vented and flushed free of hydrogen by nitrogen gas. One hundred and ninety five parts of 2-dodecene are then added to the autoclave which is resealed and heated to 300° C. with constant agitation. Heating is continued for about 2 hours after which time the autoclave is cooled to room temperature and vented. The reaction mass is hydrolyzed with dilute HCl, washed and rectified at low pressure to give a good yield of 2-(1'-methylundecyl) phenol and 2,6-di-(1'-methylundecyl) phenol.

EXAMPLE 20

The procedure of Example 19 is repeated except that 320 parts of 2-eicosene are reacted with the phenol-aluminum reaction product to give a good yield of 2-(1'-methylnonadecyl) phenol and 2,6-di-(1'-methylnonadecyl) phenol.

EXAMPLE 21

Procedure of Example 2 is repeated except that 27 parts of aluminum are reacted with 110 parts of o-cresol. The alkylation with ethylene proceeds at a reduced rate. However, when the pressure in the reaction vessel becomes constant the reaction may be discontinued and a good yield of 2-methyl-6-ethyl phenol is recovered from the reaction mixture.

Example 21 demonstrates that it is possible to carry out the process of this invention under conditions wherein only a minor proportion of the phenol reactant exists as the free phenol, the greater proportion existing as the aluminum phenolate.

EXAMPLE 22

Following the procedure of Example 1, 154 parts of pentamethyl phenol are reacted with 27 parts of aluminum to form aluminum penta-methyl phenolate. This aluminum penta-methyl phenolate is admixed with 1000 parts of phenol which is subsequently alkylated with isobutylene under the conditions set forth in Example 8. A high yield of o-tert-butylphenol results.

Example 22 illustrates that a completely substituted phenol may be used to prepare the catalyst in the process of this invention. In this case the catalyst phenol which is first reacted with aluminum will not itself undergo alkylation, and may be a different specie than the phenol reactant.

EXAMPLE 23

Proceeding as in Example 22, 27 parts of aluminum are reacted with 61 parts of 2,6-dimethyl phenol and 54 parts of o-cresol. The resulting catalyst mixture is admixed with 1500 parts of phenol and the resulting mixture is alkylated with isobutylene under conditions set forth in Example 11 to give a high yield of 2,6-di-tert-butyl phenol.

Example 23 is an illustration of the use of a mixture of aluminum phenolates in the process of this invention.

In general, the process of this invention can be carried out at temperatures ranging from 0 to about 500° C. and at pressures of from less than 1 atmosphere to about 3000 atmospheres or higher. The optimum temperature and pressure of a particular reaction depends on the reagents. For example, when the unsaturated compound which is to be used for introducing a group onto the aromatic ring of a phenol has at least one hydrogen atom on each of the doubly bonded carbon atoms, we prefer to use temperatures ranging from about 150° C. and pressures in the range of 1–3000 atmospheres. When alkylating phenols, such as hydroxy-benzenes and hydroxy naphthalenes, olefinic hydrocarbons such as ethylene, propylene, butylene, hexene, decene, octene, eicosene, and the like, the especially preferred reaction pressures are from less than one atmosphere to about 500 atmospheres. However, higher temperatures and pressures can be used. Alkylation of a phenol with ethylene requires, for best results, a higher pressure and temperature than does alkylation of a phenol with propylene, while alkylation with a hydrocarbon such as decene can be conducted at the vapor pressure of the system.

Another situation arises when at least one of the doubly-bonded carbon atoms in the unsaturated compound which is used has no hydrogen attached thereto. It has been found that in this case temperatures ranging from 0 to 500° C. and pressures of from 1 to 3000 atmospheres can be employed. When using increased temperatures and pressure condition, good results are obtained when the reaction time is shortened. However, a good yield of ortho alkyl phenols may be obtained under the general pressure and temperature conditions discussed hereinabove. A preferred embodiment when reacting a phenol such as hydroxy benzene with an olefinic hydrocarbon in which at least one of the doubly bonded carbon atoms has no hydrogen attached thereto, as for example, isobutylene, is to conduct the reaction at temperatures up to about 300° C. and pressures up to about 500 atmospheres, although higher temperatures and pressures can also be used.

It was stated above that the phenols that can be used in carrying out the process of this invention can be mono- or poly-nuclear and mono- or poly-hydroxy, and that they may or may not have other substituents on the ring, the requirement being that there be a position ortho to the hydroxy group available for substitution. Non-limiting examples of such phenols are phenol, o-cresol, m-cresol, p-cresol, o-chlorophenol, m-chlorophenol, p-chlorophenol, 2,5-di-chlorophenol, p-bromophenol, o-cyclohexylphenol, p-cyclohexylphenol, catechol, resorcinol, hydroquinone, pyrogallol, hydroxy-hydroquinone, phloroglucinol, eugenol, isougenol, carvacol, thymol, o-hydroxydiphenyl, m-hydroxydiphenyl, p-hydroxydiphenyl, naphthol-1, 3-chloronaphthol-1, 6-bromonaphthol-1, 3-methylnaphthol-1, and the like.

Among the unsaturated compounds that can be used to introduce organic groups onto the aromatic nucleus are mono- and poly-olefins such as ethylene, propylene, butylene, isobutylene, amylene, isoamylene, 2-methylamylene, hexene, heptene, heptadienes, octene, isoprene, di-isobutylene, decene, dodecene, hexadecene, cumulene, octadecene, eicosene, styrene, 2-phenylpropene-1, 3-phenylpropene-1, 2-phenylbutene-1, 3-phenylbutene-1, etc.

Mixed olefins such as are obtained by polymerizing propylenes or butylenes by known methods, having from about 8 to about 12 carbon atoms, can also be used as well as mixtures of other olefins.

Non-limiting examples of products that can be obtained by our process in addition to those given hereinabove are 3-methyl-2-ethylphenol, 3-methyl-6-ethylphenol and 3-methyl-2,6-diethylphenol, obtained by the reaction of 3-methylphenol with ethylene in the presence of aluminum 3-methyl phenoxide; 3-methyl-2-isopropylphenol, 3-methyl-6-isopropylphenol, and 3-methyl-2,6-diisopropylphenol obtained by the reaction of 3-methylphenol with propylene in the presence of aluminum 3-methyl phenoxide; 2-ethyl-6-tert-butyl-phenol, obtained by the reaction of phenol with ethylene in the presence of a phenoxide catalyst and then reacting the 2-ethylphenol obtined in this manner with isobutylene in the presence of a phenoxide catalyst such as aluminum-2-ethyl phenoxide; 2-(2-eicosyl)-phenol obtained by the reaction of phenol with eicosene-1 in the presence of a phenoxide catalyst; 2-decylnaphthol-1 with decene-1 in the presence of a phenoxide catalyst such as aluminum naphthoxide; 2-tert-butylanthrol-1 obtained by the reaction of anthrol-1 with isobutylene in the presence of a phenoxide catalyst; 3 - chloro - 2 - isopropylphenol, 3 - chloro - 6 - isopropylphenol and 3-chloro-2,6-di-isopropylphenol obtained by the reaction of 3-chlorophenol with propylene in the presence of a phenoxide catalyst; 2-(1-methyl-3-hydroxy ethyl) phenol obtained by the reaction of phenol with pentene-4-ol-1 in the presence of a phenoxide catalyst such as aluminum phenoxide;

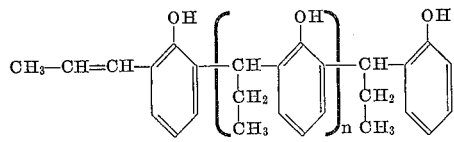

obtained by reacting anol in the presence of a phenoxide catalyst such as aluminum anolate.

In carrying out the process of this invention the reagents can often be reacted without the presence of any diluent. However, it is within the scope of this invention to conduct the process of this invention with either or both of the reactants dissolved in one or more solvents or a mixture of solvents. The solvent can be either liquid or gaseous, depending primarily on the state of the reactant which is to be diluted at the time of introduction into the reaction vessel or zone. The solvent should be one which is inert to the components including the catalyst under the conditions of the reaction. Paraffins, cycloparaffins, aromatic hydrocarbons, and inert gases, and the like are examples of suitable solvent types which may be compatible with one or more of the reagents that can be used in practicing our invention. Specific examples of solvents include n-octane, isooctane, cyclohexane, benzene, alkyl benzenes, hydrogen, nitrogen, argon, and the like. Also, one of the reacting components can be employed as a solvent, as for example, an excess of phenol may serve as a suitable diluent.

In the commercial production of the compounds of our invention it is particularly attractive to conduct the process in a continuous manner. This can be done by a variety of techniques such as passing the reactants together with the catalyst, either substantially pure or admixed with an inert carrier, through a reaction zone. The product stream can be hydrolyzed and purified by distillation in a continuous fractionation column. The continuous method for the production of the compounds of our invention can be carried out either in a "once through" manner or with recycling of reactants and products. In continuous and batch modifications of our invention, the reactants can be diluted with inert gases such as propane, ethane, methane, nitrogen, helium, neon and the like, as well as with other gaseous or liquid diluents or solvents of the kind described hereinabove.

As was pointed out above, it has been found that a new class of compounds which are useful as antioxidants can be prepared by the process of this invention. These compounds are characterized as 3,6-dialkyl catechols having from 14 to about 26 carbon atoms in the molecule, in which each alkyl group has from 4 to about 10 carbon atoms and has at least one branched chain and the carbon atom immediately adjacent the benzene nucleus. Examples of these compounds are 3,6-di-(1,1,3-trimethylbutyl) catechol, 3,6-di-tert-butyl catechol, 3,6-di-(1-methylnonyl) catechol, 3,6-di-(1-methylpentyl) catechol, and 3,6-di-(1-methyl-2-propylbutyl) catechol. Of these compounds, the preferred species is 3,6-di-tert-butyl catechol as it is an outstandingly better antioxidant.

The following examples in which all parts are by weight, illustrate the preparation and isolation of typical novel catechols of this invention.

EXAMPLE 24

A pressure resistant vessel having a removable cap for charging and discharging liquids and solids, and which is equipped with a plurality of gas inlet and outlet lines, temperature measuring device, pressure gages and a mechanical agitator was flushed with nitrogen and charged with 440.4 parts of catechol, 272 parts of toluene and 34 parts of aluminum isopropoxide. The vessel was sealed and charged with isobutylene and heated to between 230 and 250° C. for 75 minutes. The vessel was then cooled and the contents were discharged into a distillation apparatus and the volatile components were collected and charged to a 3-foot helix packed column and rectified at a reduced pressure of 10 millimeters. Twenty-six parts of a relatively volatile compound were collected at 133.5 to 135° C., 300 parts of 3,6-di-tert-butyl catechol were collected at between 151.5 and 154° C., and a substantial amount of higher boiling components were also collected. After recrystallization from iscooctane the 3,6-di-tert-butyl catechol had a melting point of 83 to 84° C.

The 3,6-di-tert-butyl catechol was subjected to analysis for carbon and hydrogen. The analysis showed 74.1 percent carbon and 9.26 percent hydrogen to be present. Infra-red analysis indicated a tetra-substituted benzene nucleus in which the four substituents were on consecutively adjacent carbon atoms.

EXAMPLE 25

The procedure of Example 24 is followed except that an excess 2,4,4-trimethyl-pentene-1 is reacted with the aluminum isopropoxide-catechol mixture. A good yield of 3,6-di-(1,1,3,3-tetramethylbutyl) catechol is separated from the reaction mixture.

EXAMPLE 26

Following the general alkylation procedure of Example 2 a mixture of 10 parts of aluminum 3,6-di-tert-butyl phenolate and 400 parts of catechol are reacted with an excess of 1-butene to yield in the reaction product a substantial amount of 3,6-di-(1-methylpropyl) catechol.

EXAMPLE 27

Example 9 is repeated except that 50 parts of catechol and 4 parts of aluminum isopropoxide are substituted for the phenol and aluminum. 3,6-di-(methylnonyl) catechol is separated from the reaction mixture in good yield.

As stated above the novel compounds of this invention are valuable antioxidants in organic material normally tending to deteriorate in the presence of oxygen. It has been found in particular that outstanding results are obtained when 3,6-di-tert-butyl catechol is added to gasoline normally tending to deteriorate in the presence of air.

To demonstrate the superiority as an antioxidant of the novel 3,6-alkyl catechol of this invention, comparative tests were conducted using a representative unsaturated hydrocarbon, 2,4,4-trimethyl-pentene-1, which is found in many cracked gasolines. For comparative purposes, 3,6-di-tert-butyl catechol (the preferred antioxidant) and 4-methyl-2,6-di-tert-butyl phenol were tested in separate portions of the hydrocarbon. The test procedure was the standard method of the American Society for Testing Materials for the determination of the oxidation stability of gasoline (Induction Period Method) ASTM Designation: D-525-46, as fully described in Part III-A, ASTM Standards for 1946. According to this method, the induction period is the period during which there is no drop in pressure indicating no absorption of oxygen, when the test material is placed in a test bomb maintained at a temperature of 100° C. with an initial pressure of 100 pounds per square inch gage of oxygen.

The materials tested for antioxidant activity were added to the 2,4,4-trimethyl-pentene-1 in amount sufficient to give a composition containing 4 milligrams of antioxidant per 100 milliliters of the hydrocarbon. Comparative ratings were established by dividing the induction period of each antiodixant-containing sample by the induction period of a sample of 2,4,4-trimethylpentene-1 which contained no added antioxidant. The results of these tests are summarized in Table II.

TABLE II
[Antioxidant activity in 2,4,4-trimethyl-pentene-1]

| Antioxidant | Induction period, minutes | Rating |
|---|---|---|
| None | 95 | 1 |
| 3,6-di-tert-butyl catechol | 810 | 8.8 |
| 4-methyl-2,6-di-tert-butyl phenol | 405 | 4.4 |

The data in Table II indicate that 3,6-di-tert-butyl catechol is a superior antioxidant. In particular, it is noteworthy that this compound shows at least 200 percent of the antioxidant activity of 4-methyl-2,6-di-tert-butyl phenol, which compound is a standard, widely used commercial antioxidant.

The 3,6-dialkyl catechol compounds of this invention are also of superior utility when compared to other known alkyl catechols. Since they are substituted in the 3 and 6 positions with large branched chain alkyl radicals, they are less inclined to be alkali extracted from the fuels, than are the catechols which are substituted in other positions or which contain alkyl substituents which have fewer carbon atoms or are not so highly branched.

The following examples illustrate the use of 3,6-dialkyl catechols as antioxidants in various organic compositions. All parts are by weight, unless otherwise stated.

EXAMPLE 28

To 1000 parts of a gasoline having 45.2 percent paraffins, 29.4 percent olefins and 25.4 percent aromatics, an initial evaporation temperature of 98° F. and a final evaporation temperature of 390° F. is added 1 part of 3,6-di-tert-butyl catechol. The mixture is agitated to dissolve the 3,6-di-tert-butyl catechol in the fuel.

EXAMPLE 29

To 1000 parts of a gasoline having 39.7 percent paraffins, 27.7 percent olefins and 32.6 percent aromatics, an initial evaporation temperature of 92° F. and a final evaporation temperature of 369° F. is added 10 parts of 3,6-di-(1-methylnonyl) catechol. The mixture is agitated to dissolve the 3,6-di-(1-methylnonyl) catechol in the fuel.

EXAMPLE 30

To 1000 parts of a gasoline having 35.3 percent paraffins, 34.2 percent olefins and 30.5 percent aromatics, an initial evaporation temperature of 90° F. and a final evaporation temperature of 378° F. is added 5 parts of 3,6-di-(1,1,3,3-tetramethylbutyl) catechol.

EXAMPLE 31

To 1000 gallons of a gasoline having 49.7 percent paraffins, 22.3 percent olefins and 28.0 percent aromatics, an initial evaporation temperature of 81° F. and a final evaporation temperature of 410° F. is added 3000 milliters of tetraethyllead, 1.0 theory of chlorine as ethylene dichloride, 0.5 theory bromine as ethylene dibromide and 18 grams of 3,6-di-(1-methylpropyl) catechol. The mixture is agitated until a homogeneous solution of all the ingredients is achieved.

EXAMPLE 32

To 1000 parts of a commercially available diesel fuel having a cetane number of 51.7, an API gravity of 37.0, a heat content of 19,620 B.t.u. per pound and a 50 percent boiling point of 509° F. is added, with agitation, 6 parts of 3,6-di-(1,1-dimethylpropyl) catechol.

EXAMPLE 33

To 1000 parts of a commercially available kerosene having an initial evaporation temperature of about 585° F. is added 50 parts of 3,6-di-tert-butyl catechol.

EXAMPLE 34

To an antiknock fluid composition to be used as an additive to gasoline, and which contains 614.8 parts of tetraethyllead, 178.6 parts of ethylene dibromide and 188.1 parts of ethylene dichloride is added with agitation 12 parts of 3,6-di-(1-ethylbutyl) catechol.

EXAMPLE 35

The resistance to oxygen of a natural rubber tire-tread formulation having an initially poor resistance to oxidative deterioration and which is composed of 100 parts of smoked sheet, 45 parts of carbon black, 5 parts of zinc oxide, 3 parts of stearic acid, 3 parts of sulfur and 0.65 part of mercapto-benzothiazol is greatly improved by the inclusion therein of 1 part of 3,6-di-tert-butyl catechol.

EXAMPLE 36

To 100 parts of polyethylene produced by oxygen catalyzed reaction under a pressure of 20,000 atmospheres and having an average molecular weight of 40,000 is added and mixed 5 parts of 3,6-di-tert-butyl catechol as an antioxidant.

The above examples illustrate compositions of this invention which possess greatly enhanced resistance to oxidative deterioration by virtue of the presence therein of a novel 3,6-dialkyl catechol of this invention.

3,6-dialkyl catechols find important utility as an antioxidant in a wide variety of other oxygen sensitive materials. Thus, the addition of small quantities of this compound to such materials as turbine, hydraulic, transformer and other highly refined industrial oils; synthetic lubricants such as diester oils, halogenated hydrocarbon and polyalkylene glycols; waxes; elastomers including natural rubber; crankcase lubricating oils; soaps and greases; plastics; organo metallic compositions such as tetraethyllead and tetraethyllead antiknock fluids; and the like, greatly increases their resistance to deterioration in the presence of oxygen, air or ozone.

The 3,6-dialkyl catechol compounds of this invention are also very effective antioxidants for high molecular weight hydrocarbon polymers, such as polyethylene, polystyrene, polyisobutylene, polybutadiene, isobutylene-styrene copolymers, natural rubber, butyl rubber, GR–S rubber, GR–N rubber, polybutene rubber, piperlene rubber, dimethyl butadiene rubber and the like.

3,6-dialkyl catechols are also useful in protecting petroleum wax—paraffin wax and micro-crystalline wax—against oxidative deterioration. The compounds of this invention also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

Following examples illustrate typical edible compositions protected by a 3,6-dialkyl catechol of this invention.

EXAMPLE 37

Two parts of 3,6-di-(1-methylpentyl) catechol are blended with 10,000 parts of lard. The resulting protected lard is stable over long storage periods in contradistinction to the unprotected product.

EXAMPLE 38

To 5,000 parts of olive oil is added 1 part of 3,6-di-tert-butyl catechol and the mixture is agitated to produce a homogeneous blend which is stable to oxidative deterioration for a long period.

The amounts of 3,6-dialkyl catechol employed are dependent upon the nature of the material to be protected and the conditions to be encountered. Generally speaking, amounts in the order of about 0.001 to about 5 percent by weight of the material to be protected can be used. However, in most instances where the material to be protected does not have an unusually high oxidative instability amounts from about 0.01 to about 1.0 percent are satisfactory.

Other compounds made by the process of this invention have a variety of uses such as monomers for phenolic resins, detergent intermediates, germicides, polymerization inhibitors, antioxidants, intermediates for dye syntheses and the like. As specific examples, o-tert-amylphenol is an outstanding ingredient for marine antifouling paints and as an antiskinning agent for paints and varnishes, and 2,6-di-tert-butylphenol and 2,6-diisopropylphenol are useful antioxidants in a wide variety of materials.

We claim:

1. Organic material normally tending to deteriorate in the presence of air, containing a small antioxidant quantity up to 5 percent of a catechol compound having the formula:

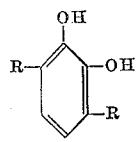

where R is an alkyl group of from 4–10 carbon atoms which has a branch on the carbon atom immediately adjacent the catechol nucleus.

2. Gasoline containing a small antioxidant quantity—up to about 5 percent—of the compound 3,6-di-tert-butyl catechol.

References Cited in the file of this patent

UNITED STATES PATENTS

| | | |
|---|---|---|
| 1,945,521 | Downing et al. | Feb. 6, 1934 |
| 2,181,102 | Stoesser et al. | Nov. 21, 1939 |
| 2,439,421 | Erickson | Apr. 13, 1948 |
| 2,603,662 | Stevens | July 15, 1952 |
| 2,831,817 | Ecke et al. | Apr. 22, 1958 |
| 2,831,898 | Ecke et al. | Apr. 22, 1958 |